(12) United States Patent
Nakata et al.

(10) Patent No.: US 8,601,905 B2
(45) Date of Patent: Dec. 10, 2013

(54) DRIVING FORCE TRANSMITTING APPARATUS

(75) Inventors: Tomoyuki Nakata, Tochigi (JP); Masaru Ohmori, Tochigi (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 75 days.

(21) Appl. No.: 13/157,848

(22) Filed: Jun. 10, 2011

(65) Prior Publication Data

US 2011/0232404 A1  Sep. 29, 2011

Related U.S. Application Data

(62) Division of application No. 12/187,173, filed on Aug. 6, 2008, now Pat. No. 8,042,431.

(30) Foreign Application Priority Data

Aug. 13, 2007  (JP) .................................. 2007-211070

(51) Int. Cl.
*F16H 57/02*  (2012.01)

(52) U.S. Cl.
USPC ........................................ 74/606 R

(58) Field of Classification Search
USPC ............................ 74/412 R, 416, 417, 606 R
See application file for complete search history.

(56) References Cited

U.S. PATENT DOCUMENTS

| | | | | |
|---|---|---|---|---|
| 4,554,844 A | * | 11/1985 | Hamano ..................... | 74/606 R |
| 4,911,035 A | * | 3/1990 | Taguchi ..................... | 74/606 R |
| 6,158,303 A | * | 12/2000 | Shiraishi et al. ........... | 74/665 T |
| 2006/0058148 A1 | * | 3/2006 | Miyazaki et al. ........... | 475/200 |

FOREIGN PATENT DOCUMENTS

| | | |
|---|---|---|
| JP | 58-142461 U | 9/1983 |
| JP | 62-112357 U | 7/1987 |
| JP | 64-018669 U | 1/1989 |
| JP | 1-111862 U | 7/1989 |
| JP | 2-31947 U | 2/1990 |
| JP | 2-74648 U | 6/1990 |
| JP | 10272944 A | 10/1998 |
| JP | 10325456 A | 12/1998 |
| JP | 2000-65191 | 3/2000 |
| JP | 2003254414 A | 9/2003 |

OTHER PUBLICATIONS esp@cenet patent abstract for Japanese Publication No. 2000065191, Publication date Mar. 3, 2000 (1 page).

(Continued)

*Primary Examiner* — Vicky Johnson
(74) *Attorney, Agent, or Firm* — Osha Liang LLP

(57) ABSTRACT

A driving force transmitting apparatus has a first division casing member having a first coupling surface, a second division casing member having a second coupling surface, wherein a casing is formed by matching the first and second casing members at the first and second coupling surfaces, a first rotational shaft rotatably supported by the first and the second division casing members, wherein a center of rotation of the first rotational shaft is located in a common plane of the first and second coupling surfaces, a first gear provided on the first rotational shaft, a second rotational shaft rotatably supported with respect to the first division casing member, a second gear provided on the second rotational shaft and being in mesh with the first gear, and a partition wall integrally formed on the second division casing member and extending in a direction intersecting with said common plane.

23 Claims, 9 Drawing Sheets

(56) References Cited

OTHER PUBLICATIONS

Office Action Issued in Japanese Patent Application No. 2007-211070, Dated Feb. 6, 2012 (11 Pages with English Translation).
English Patent Abstract of JP 2003254414 from esp@cenet, Publication Date Sep. 10, 2003 (1 Page).
English Patent Abstract of JP 10272944 from esp@cenet, Publication Date Oct. 13, 1998 (1 Page).
Office Action for Japanese Patent Application No. 2007-211070 dated Jun. 14, 2011, with English translation thereof (7 pages).
espacenet, Patent Abstract for Publication No. 10325456 Published Dec. 8, 1998 (1 page).

* cited by examiner

DRIVING FORCE TRANSMITTING APPARATUS

CROSS REFERENCE TO RELATED APPLICATIONS

This application is a division of U.S. patent application Ser. No. 12/187,173, filed on Aug. 6, 2008, now U.S. Pat. No. 8,042,431 which claims foreign priority from Japanese Patent Application No. 2007-211070 filed on Aug. 13, 2007, the entire contents of which are hereby incorporated by reference.

BACKGROUND OF THE INVENTION

1. Field of the Invention

The present invention relates to a driving force transmitting apparatus used for a transfer or a final reduction apparatus.

2. Background Art

A conventional driving force transmitting apparatus is disclosed, for example, in JP-A-2000-065191. FIG. 16 is a sectional view showing a final reduction apparatus as an example of the conventional driving force transmitting apparatus, FIG. 17 is a rear side view of a carrier of the final reduction apparatus, and FIG. 18 is a front side view of a cover of the final reduction apparatus.

As shown in FIG. 16 through FIG. 18, a breather chamber 211 is formed so as to be opposed to coupling surfaces 207 and 209 of carrier 203 and cover 205 of the final reduction apparatus 201. The breather chamber 211 is defined as a space surrounded by outer walls 213, 215 of the carrier 203 and the cover 205 and the ribs 217, 219 thereof. A communication path 221 is formed at a part of the rib 217. Oil paths 227 and 229 located between the ribs 217, 219 and ribs 223,225 formed downward thereof are communicated with the breather chamber 211 through the communication path 221. A partition plate 231 is provided in the oil paths 227 and 229. The partition plate 231 prevents a lubricant oil lifted by a ring gear 233 from flowing from the oil paths 227, 229 into the communication path 221.

The ribs 217 and 219 protrude from insides of the outer walls of the carrier 203 and the cover 205 in a die removing direction. That is, the ribs 217 and 219 extend to the coupling surfaces 207 and 209. The breather chamber 211 is formed to be divided into sides of the carrier 203 and the cover 205, respectively.

Therefore, the carrier 203 and the cover 205 are matched and coupled to each other at the coupling surfaces 207 and 209, and it is possible to easily form the breather chamber 211 over the carrier 203 and the cover 205.

However, in the conventional structure, as the partition plate 231, an L-shaped rectangular coupling portion 231a cannot be formed by a die-casting of the carrier 203 and the cover 205, because the partition plate 231 is perpendicular to the die removing direction so that the partition plate 231 can not be removed from die if the partition plate 231 is integrally formed by the die-casting integrally with the carrier 203 or the cover 205. Accordingly, it is necessary to manufacture the partition plate 231 as a separate member by punching a metallic plate. Therefore, machining, assembly and parts management of the partition plate 231 become complicated, resulting in an increase in production costs. Further, clearance is likely to occur between the partition plate 231, the carrier 203 and the cover 205, wherein it is insufficient in view of preventing lubricant oil from invading the communication path 221.

SUMMARY OF THE INVENTION

One or more embodiments of the invention provides a driving force transmitting apparatus for resolving problems caused by a partition plate, that is, machining, assembly and parts management of a partition plate that are complicated, resulting in an increase in production costs, clearance is likely to occur between the partition plate, carrier and cover, and it is insufficient to prevent lubricant oil from invading the communication path.

In accordance with one or more embodiments of the invention, a driving force transmitting apparatus is provided with: a first division casing member having a first coupling surface; a second division casing member having a second coupling surface, in which a casing is formed by matching the first and second casing members at the first and second coupling surfaces; a first rotational shaft rotatably supported by the first and the second division casing members, in which a center of rotation of the first rotational shaft is located in a common plane of the first and second coupling surfaces; a first gear provided on the first rotational shaft; a second rotational shaft rotatably supported with respect to the first division casing member; a second gear provided on the second rotational shaft and being in mesh with the first gear; a first partition wall integrally formed on the first division casing member and extending in a matching direction of the first and the second division casing members which is substantially perpendicular to the common plane of the first and second coupling surfaces; a second partition wall integrally formed on the second division casing member and extending in the matching direction; a third partition wall crossing the first partition wall and being apart from the common plane of the first and second coupling surfaces in the matching direction; a breather chamber connected with an interior of the casing via a communication port and defined by the first partition wall, the second partition wall, the third partition wall, an outer wall of the first division casing member and the an outer wall of the second division casing; and an opening port that connects the breather chamber and an exterior of the casing.

According to the above driving force transmitting apparatus, since the first, the second, and the third partition walls can be integrally cast-molded with the first and the second division casing members, machining, assembly and parts management can be facilitated, and the production costs can be reduced. Since the driving force transmitting apparatus is not provided with a partition plate that intervenes and is supported between the first coupling surface and the second coupling surface, working, assembly and parts management are facilitated, and the production costs can be further reduced. And, hardly any clearance is brought between the first and the second coupling surfaces, and lubricant oil can be prevented from invading the communication port.

The driving force transmitting apparatus may include an opening formed on the first casing member, in which the second rotational shaft passes through the opening. The third partition wall may be opposed to an opening surface of the opening. The second gear may be disposed to be opposed to a rear side of the third partition wall, the rear side of the third partition wall being a side which is opposite to the common plane of the first and second coupling surfaces.

The driving force transmitting apparatus may include a cylindrical bearing case attached to the opening, in which the second rotational shaft is rotatably supported in the cylindrical bearing case.

In the driving force transmitting apparatus, the opening port may pass through the common plane of the first and second coupling surfaces.

The driving force transmitting apparatus may include a baffle wall provided in the breather chamber and extending along the matching direction, in which the baffle wall intervenes between the communication port and the opening port.

In the driving force transmitting apparatus, the baffle wall may have a distal end downward-inclined toward the communication portion located in a lower side of the baffle wall.

The driving force transmitting apparatus may include a is recessed portion provided on an outer wall surface of the casing, in which a closed space is formed by the recessed portion when the casing is fixed to another apparatus. The opening port may be connected to the recessed portion.

Moreover, in accordance with one or more embodiments of the invention, a driving force transmitting apparatus is provided with: a first division casing member having a first coupling surface; a second division casing member having a second coupling surface, in which a casing is formed by matching the first and second casing members at the first and second coupling surfaces; a first rotational shaft rotatably supported by the first and the second division casing members, wherein a center of rotation of the first rotational shaft is located in a common plane of the first and second coupling surfaces; a first gear provided on the first rotational shaft; a second rotational shaft rotatably supported with respect to the first division casing member; a second gear provided on the second rotational shaft and being in mesh with the first gear; an opening formed on the first casing member, in which the second rotational shaft passes through the opening; a horizontal partition wall integrally formed on the first division casing member and extending in a matching direction of the first and the second division casing members which is substantially perpendicular to the common plane of the first and second coupling surfaces; a vertical partition wall which crosses the horizontal partition wall, is apart from the common plane of the first and second coupling surfaces in the matching direction, and is opposed to an opening surface of the opening; a breather chamber connected with an interior of the casing via a communication port and defined at least by the horizontal partition wall, the vertical partition wall and an outer wall of the first division casing member; and an opening port that connects the breather chamber and an exterior of the casing.

Furthermore, in accordance with one or more embodiments of the invention, a driving force transmitting apparatus is provided with: a first division casing member having a first coupling surface; a second division casing member having a second coupling surface, wherein a casing is formed by matching the first and second casing members at the first and second coupling surfaces; a first rotational shaft rotatably supported by the first and the second division casing members, wherein a center of rotation of the first rotational shaft is located in a common plane of the first and second coupling surfaces; a first gear provided on the first rotational shaft; a second rotational shaft rotatably supported with respect to the first division casing member; a second gear provided on the second rotational shaft and being in mesh with the first gear; a partition wall integrally formed on the second division casing member and extending in a matching direction of the first and the second division casing members which is substantially perpendicular to the common plane of the first and second coupling surfaces; a shield plate crossing the partition wall and disposed on the second coupling surface; a breather chamber connected with an interior of the casing via a communication port and defined by the partition wall, the shield plate, and the an outer wall of the second division casing; and an opening port that connects the breather chamber and an exterior of the casing.

Other aspects and advantages of the invention will be apparent from the following description, the drawings and the claims.

DETAILED DESCRIPTION OF THE EXEMPLARY EMBODIMENTS

First Exemplary Embodiment

Entire Configuration of Four-Wheel Drive Vehicle

Figure 1:
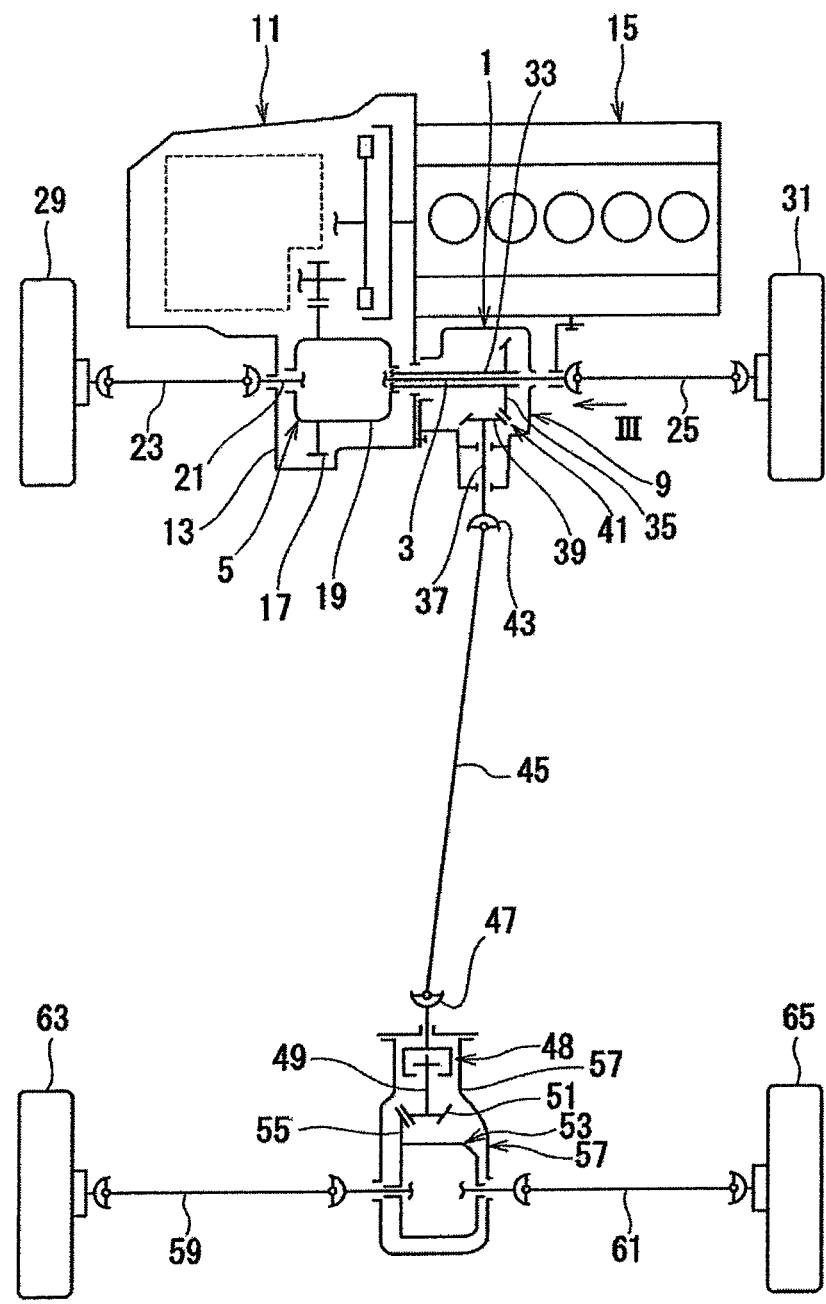
FIG. 1 is a skeleton plan view of a four-wheel drive vehicle.

FIG. 1 is a skeleton plan view of a four-wheel drive vehicle.
As shown in FIG. 1, a transfer 1 that is a driving force transmitting apparatus according to a first exemplary embodiment is disposed at an outer circumference of an intermediate shaft 3 for front wheels and is interlocked with and coupled to a rear wheel output side of a front-differential apparatus 5. A distribution casing 9 as a casing of the transfer 1 is attached to a bell housing 13 of a side of a transmission 11.

The front differential apparatus 5 is supported in the bell housing 13. The front differential apparatus 5 receives drive input from an engine 15 via the transmission 11. The drive input is input to a differential casing 19 via the ring gear 17.

Intermediate shafts 21 and 3 are coupled to the left and right side gears that are output portions of the front differential apparatus 5. The respective intermediate shafts 21 and 3 are linked with left and right front wheel axles 23 and 25, and connect the front differential apparatus 5 and the front wheel axles 23 and 25 to each other. The front wheel axles 23 and 25 are interlocked with and coupled to the left and right front wheels 29 and 31.

Therefore, driving force output of the front differential apparatus 5 is transmitted to the left and right front wheels 29 and 31 by the respective intermediate shafts 21 and 3 via the front wheel axles 23 and 25.

The transfer 1 distributes the drive input into the front differential apparatus 5 to a rear wheel side. The intermediate shaft 3 is disposed in the distribution casing 9 of the transfer 1.

A hollow shaft 33 acting as a first rotational shaft is provided in the distribution casing 9. The hollow shaft 33 is idly fitted to the outer circumference of the intermediate shaft 3. One end part of the hollow shaft 33 is spline-coupled to the differential casing 19 of the front differential apparatus 5. A ring gear 35 acting as a first gear is attached to the hollow shaft 33. The ring gear 35 is in mesh with a pinion gear 39 acting as a second gear. The pinion gear 39 is connected to a rear wheel side output shaft 37 as a second rotational shaft. The ring gear 35 and the pinion gear 39 are formed of bevel gears. The ring gear 35 and the pinion gear 39 are perpendicularly meshed with each other and compose a perpendicular gear set 41.

A propeller shaft 45 is coupled to the rear wheel side output shaft 37 through a universal joint 43. A drive pinion shaft 49 is coupled to the propeller shaft 45 via a universal joint 47 and an on-demand torque transmitting coupling 48 for four-wheel drive. A drive pinion gear 51 of the drive pinion shaft 49 is meshed with a ring gear 55 of the rear differential apparatus 53.

The rear differential apparatus 53 is supported at a carrier case 57 acting as a casing. The left and right rear wheels 63 and 65 are interlocked with and coupled to the rear differential apparatus 53 via the left and right rear wheel axles 59 and 61.

When torque is inputted from the engine 15 to the ring gear 17 of the front differential apparatus 5 via the transmission 11, the torque is transmitted to the left and right front wheels 29 and 31 via the intermediate shafts 21 and 3 and the front wheel axles 23 and 25 while the torque is also transmitted to the rear wheel side output shaft 37 via the differential casing 19, the hollow shaft 33, the ring gear 35, and the pinion gear 39.

Torque is transmitted from the rear wheel side output shaft 37 to the ring gear 55 of the rear differential apparatus 53 via the universal joint 43, the propeller shaft 45, the universal joint 47, the torque transmitting coupling 48, the drive pinion shaft 49, and the drive pinion gear 51, and the torque is further transmitted from the rear differential apparatus 53 to the left and right rear wheels 63 and 65 via the left and right rear wheel axles 59 and 61.

Thus, four-wheel drive is enabled by the front and rear wheels 29, 31, 63 and 65 based on the above torque transmission.

<Transfer>

Figure 2:
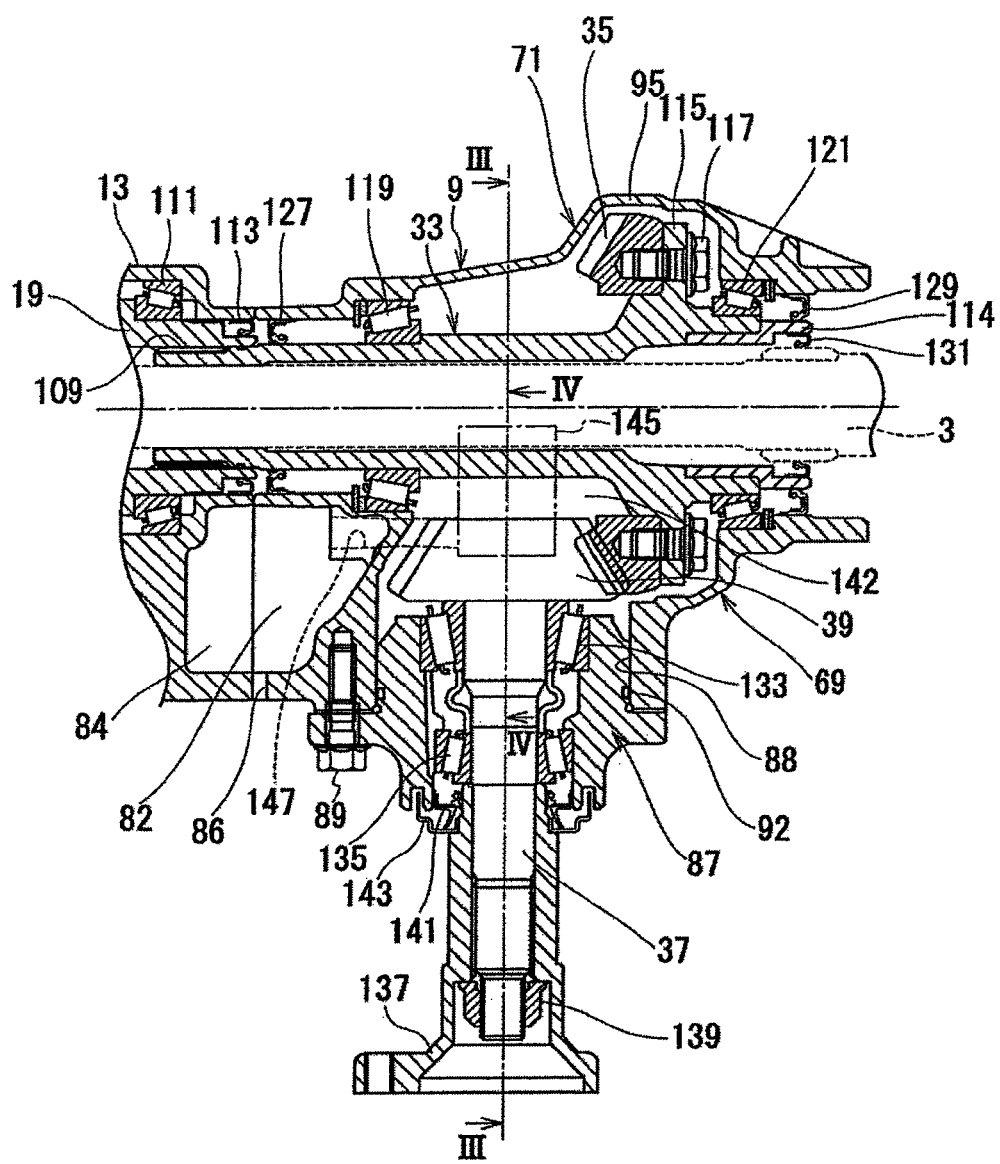
FIG. 2 is a plan sectional view of a transfer of a first exemplary embodiment.

FIG. 2 is a plan sectional view of the transfer.

The transfer 1 as shown in FIG. 2 is provided at the rear wheel output side of the front differential apparatus 5. The transfer 1 transmits the torque in front differential apparatus 5 (FIG. 1) to a side of the rear wheels 63 and 65 (FIG. 1). In the transfer 1, the hollow shaft 33 and the rear wheel side output shaft 37 are rotatably supported at the distribution casing 9 acting as the casing.

Figure 3:
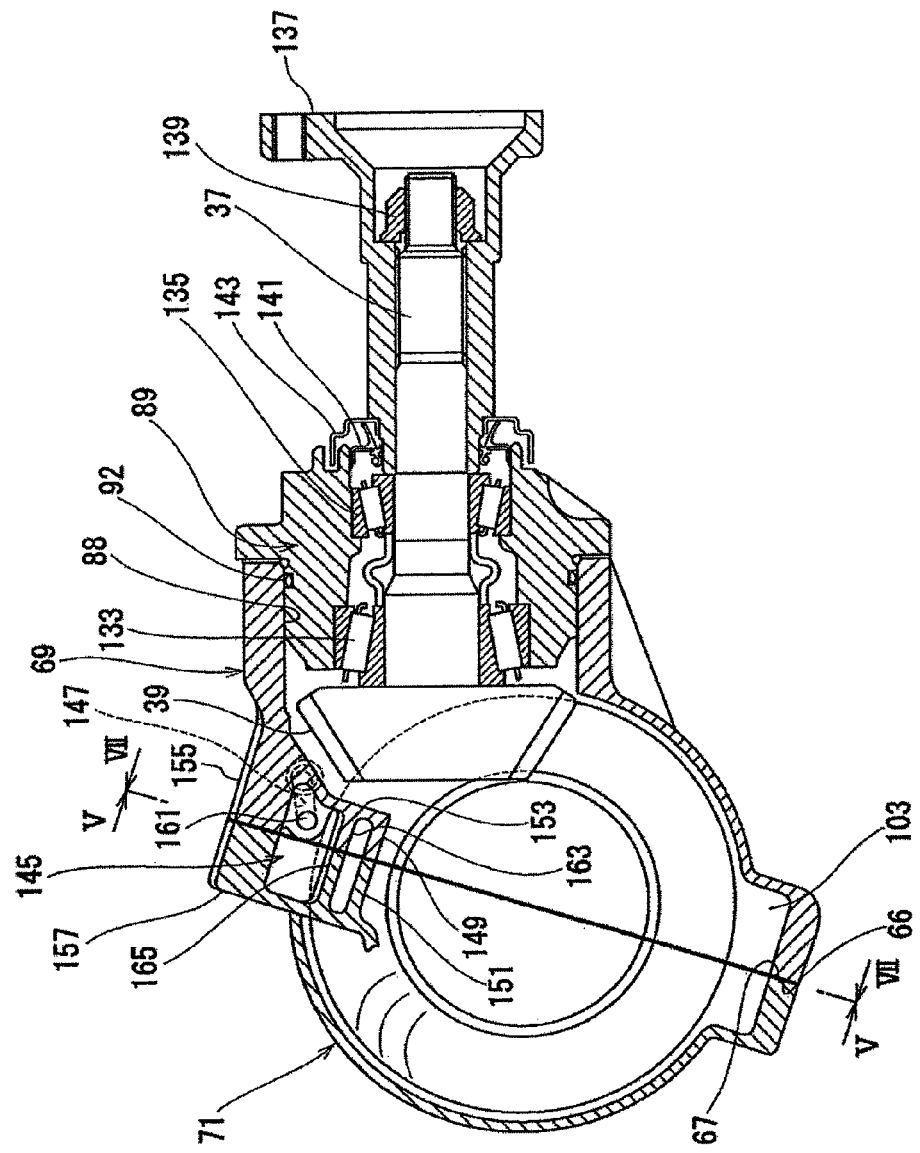
FIG. 3 is a sectional view of the arrow III-III in FIG. 2.
Figure 4:
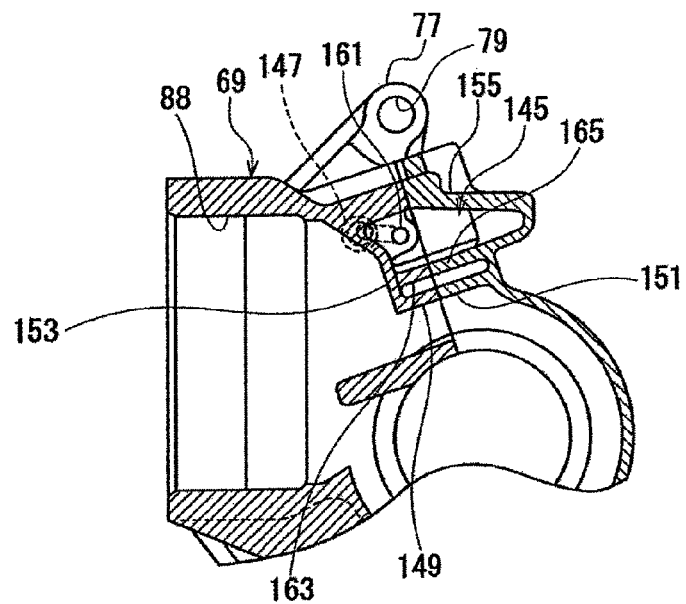
FIG. 4 is a sectional view of the major parts of a distribution casing along the arrow IV-IV in FIG. 2.
Figure 5:
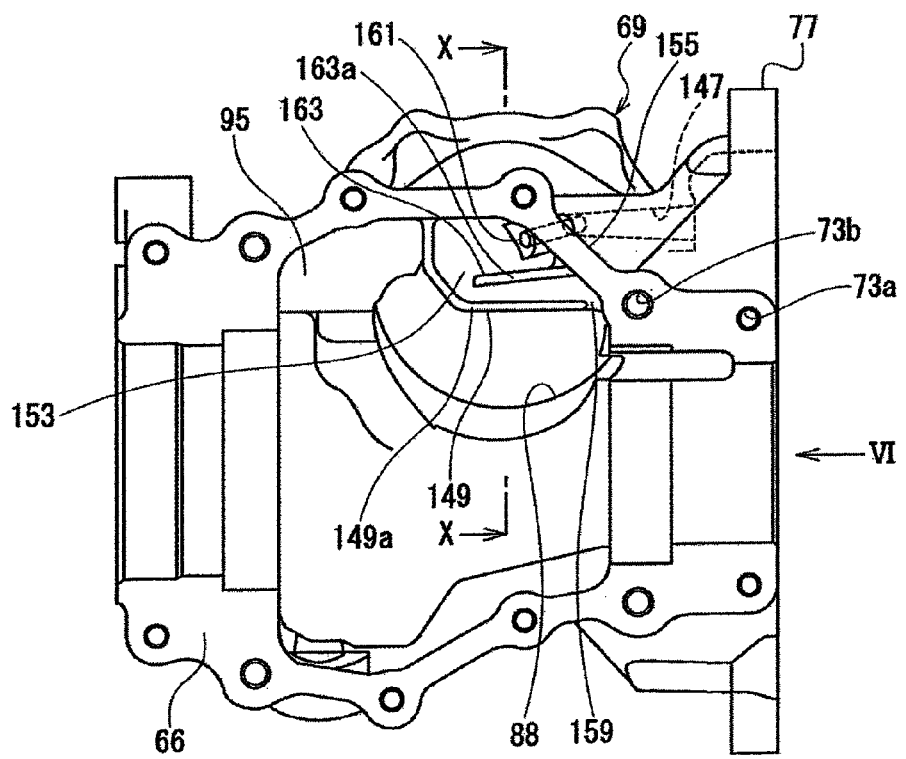
FIG. 5 is a front view of the casing main body along the arrow V-V in FIG. 3.
Figure 6:
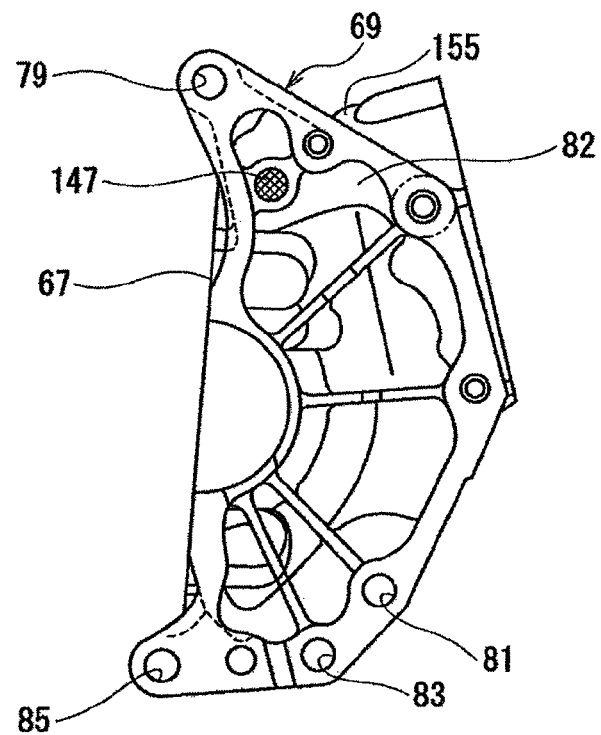
FIG. 6 is a side view along the arrow VI in FIG. 5.
Figure 7:
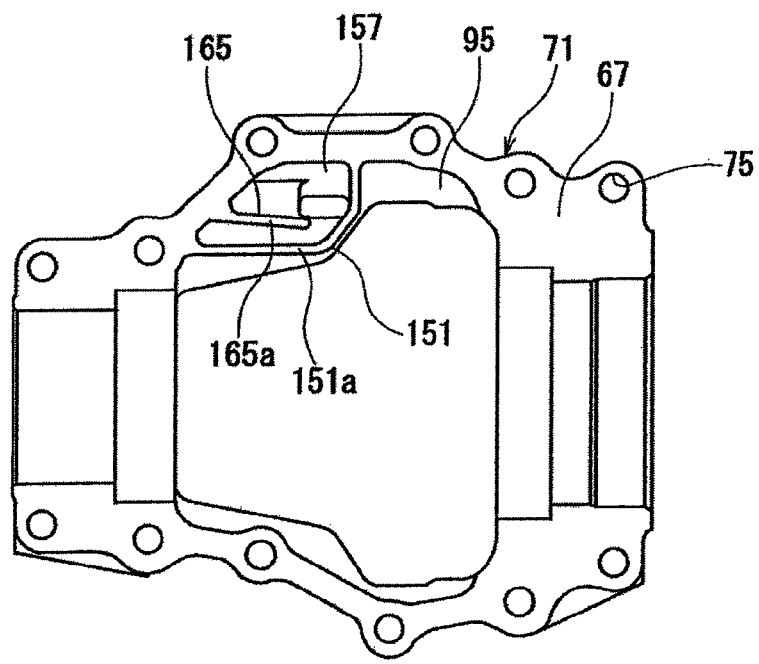
FIG. 7 is a front view of the casing cover along the arrow VII-VII in FIG. 3.

FIG. 3 is a sectional view taken along the arrow in FIG. 2, FIG. 4 is a sectional view showing the major parts of the distribution casing taken along the arrow IV-IV in FIG. 2, FIG. 5 is a front view of a casing main body along the arrow V-V in FIG. 3, FIG. 6 is a side view taken along the arrow VI in FIG. 5, and FIG. 7 is a front view of a casing cover along the arrow VII-VII of FIG. 3.

As shown in FIG. 2 through FIG. 7, the distribution casing 9 is formed by a casing main body 69 as a first division casing member and a casing cover 71 as a second division casing member. The casing main body 69 has a first coupling surface 66. The casing cover 71 has a second coupling surface 67. An axial center of rotation of the ring gear 35 extends along a common plane of the first and the second coupling surfaces 66 and 67. A plurality of threaded holes 73a and 73b are provided in the first coupling surface 66, and a plurality of bolt insertion holes 75 corresponding to the threaded holes 73a and 73b are provided in the second coupling surface 67.

The casing main body 69 and the casing cover 71 are coupled to each other by matching the first and the second coupling surfaces 66 and 67 to each other and tightening bolts inserted through the bolt insertion holes 75 in the threaded holes 73.

In the first exemplary embodiment, as shown in FIG. 3, the first and the second coupling surfaces 66 and 67 are inclined with respect to a vertical direction so that upper part sides of the first and the second coupling surfaces 66 and 67 are inclined toward the pinion gear 39 (the rear wheel side output shaft 37).

The axial center of rotation of the hollow shaft 33 is included in the common plane of the first and the second coupling surfaces 66 and 67.

A flange portion 77 is provided at an end part side of the casing main body 69 in a direction along an axial center of rotation of the ring gear 35, and bolt insertion hole portions 79, 81, 83 and 85 are further provided.

The distribution casing 9 is matched to and attached to a wall surface of the bell housing 13, as an another apparatus, disposed on the side of the transmission 11 by bolts inserted into the bolt insertion portions 79, 81, 83 and 85 of the casing main body 69.

A recessed portion 82 is formed in the casing main body 9 and forms a closed space with a recessed portion 82 on the bell housing 13. A notch 86 is provided at one side of the recessed portion 82 and is open to an exterior.

The casing cover 71 has clearance with respect to the wall surface of the bell housing 13, so that the distribution casing 9 can be securely attached to the bell housing 13.

An opening 88 that passes through an outer wall of the casing main body 69 of is formed on the casing main body 69. A bearing case 87 that is fitted in and attached to the opening 88 is tightened and fixed by a bolt 89. A through hole 90 for oil path is formed in the bearing case 87, and an O-ring 92 is supported on the bearing case 87. The O-ring 92 is brought into close contact with the inner circumference of the opening 88.

An accommodation portion 95 of the ring gear 35 is provided in the casing main body 69 and the casing cover 71. The casing main body 69 is provided with a portion 103 located furthest downward in a direction of gravitational force. The portion 103 composes the major part of an oil reservoir enclosed in the interior of the transfer 1.

The hollow shaft 33 extends in the casing main body 69 of the distribution casing 9. The hollow shaft 33 is coupled to the boss portion of the differential casing 19 of the front differential apparatus 5 by means of a spline portion 109.

Further, the differential casing 19 is supported in the bell housing 13 by a tapered roller bearing 111, etc., and a sealing member 113 intervenes between the differential casing 19 and the bell housing 13 outside in the axial direction of the tapered roller bearing 111.

A flange portion 115 is provided on an intermediate portion of the hollow shaft 33. The ring gear 35 is tightened and fixed at the flange portion 115 by a bolt 117.

The hollow shaft 33 is rotatably supported in the casing main body 69 and the casing cover 71 by tapered roller bearings 119 and 121.

Sealing members 127 and 129 intervene between the casing main body 69, the casing cover 71 and the hollow shaft 33 further outside in the axial direction from the tapered roller bearings 119 and 121.

A sealing member 131 intervenes between the intermediate shaft 3, which passes through the axial center part of the hollow shaft 33, and the hollow shaft 33.

The rear wheel side output shaft 37 is supported at the bearing case 87 of the distribution casing 9 by means of tapered roller bearings 133 and 135.

A coupling flange member 137 is tightened to the rear wheel side output shaft 37 by a nut 139. A sealing member 141 is provided between the distal end portion of the coupling flange member 137 and the bearing case 87 of the distribution casing 9.

Therefore, the interior of the distribution casing 9 is sectioned by means of the sealing members 127, 129 and 141 to compose an oil-enclosed structure, and lubricant oil is sealed in an accommodation space 142.

A dust cover 143 supported by the coupling flange member 137 is disposed outside the sealing member 141.

<Breather Chamber>

A breather chamber 145 is formed in the distribution casing 9. The breather chamber 145 is located upward of a distal end side of the pinion gear 39 as shown in FIG. 2 and FIG. 3 in the first exemplary embodiment. The breather chamber 145 is connected to the recessed portion 82 through an opening port 147 so that the breather chamber is opened.

The breather chamber 145 is sectioned and formed between a first partition wall (horizontal partition wall) 149, a second partition wall 151, a third partition wall (vertical partition wall) 153, and the respective outer walls 155, 157 of the casing main body 69 and the casing cover 71.

The first and the second partition walls 149 and 151 are integrally formed in an interior of the casing main body 69 and the casing cover 71. Planes of the first and second partition walls are extending along a matching direction of the casing main body 69 and the casing cover 71. The matching direction is a direction substantially perpendicular to the common plane of the first and the second coupling surfaces 66 and 67. That is, in the first exemplary embodiment, the first and the second partition walls 149 and 151 are formed to be substantially perpendicular to the first and the second coupling surfaces 66 and 67 of the casing main body 69 and the casing cover 71. The words "substantially perpendicular" include an angular error of approximate 10 degrees, which is brought about by a mold-removing slope of the first and the second partition walls 149 and 151 and by a machining slope of the first and the second coupling surfaces 66 and 67. (That is, angles between the first and the second partition walls 149 and 151 and the first and the second coupling surfaces 66 and 67 may be within 80 to 100 degrees.)

The first and the second partition walls 149 and 151 have the edge sides 149a and 151a thereof formed to be flush with the first and the second coupling surfaces 66 and 67, and compose a continuous closed shape. A notch 159 is formed on the edge side 149a of the first partition wall 149, and the notch 159 functions as a communication port 159 (the same reference numeral as the notch is used) of a closed section when the first and the second coupling surfaces 66 and 67 are coupled to each other, whereby the breather chamber 145 is caused to communicate with the interior of the distribution casing 9 via the communication port 159.

The third partition wall 153 is provided at the casing main body 69 side, crosses the first partition wall 149. The third partition wall 153 has a depth with respect to the first and the second coupling surfaces 66 and 67. That is, the third partition 153 is apart from the first and the second coupling surfaces 66 and 67 in the matching direction.

A rear side of the third partition wall 153 is formed to be bent to correspond to a shape of the pinion gear 39 as shown in FIG. 3 and FIG. 4. The third partition wall 153 is opposed to an opening surface of the opening 88. That is, a lower end of the third partition wall 153 is positioned lower than an upper end of the opening 88. The pinion gear 39 of the rear wheel side output shaft 37 is assembled through the opening 88. The pinion gear 39 is opposed to the bent rear side of the third partition wall 153 with slight clearance.

The opening port 147 is provided at the casing main body 69 side, and includes an opening hole 161 adjacent to the third partition wall 153, and the breather chamber 145 is made open to the recessed portion 82.

The breather chamber 145 is provided with baffle walls 163 and 165. The baffle walls 163 and 165 are formed so that the surfaces thereof are along the matching direction of the casing main body 69 and the casing cover 71, and intervene between the communication port 159 and the opening hole 161. That is, the baffle walls 163 and 165 across a line directly connecting the communication port 159 and the opening hole 161.

The baffle walls 163 and 165 are integrally formed with the casing main body 69 and the casing cover 71, and the edge surfaces 163a and 165a are formed to be flush with the first and the second coupling surfaces 66 and 67. The baffle walls 163 and 165 extend from the first and the second coupling surfaces 66 and 67 to the communication port 159 and the opening hole 161. The baffle walls 163 and 165 are inclined downward toward the distal end side thereof.

In the first embodiment, the baffle walls 163 and 165 are formed to be substantially perpendicular to the first and the second coupling surfaces 66 and 67 of the casing main body and the casing cover 71. The words "substantially perpendicular" include an angular error of substantially 10 degrees, which is brought about by the mold-removing slope of the baffle walls 163 and 165 and by the machining slope of the first and the second coupling surfaces 66 and 67. (That is, angles between the baffle walls 163 and 165 and the first and the second coupling surfaces 66 and 67 may be within 80 to 100 degrees.)

By matching the casing main body 69 and the casing cover 71 at the first and the second coupling surfaces 66 and 67 and are tightening to each other by bolts, the first and the second partition walls 149 and 151 and the edge surfaces 149a, 151a, 163a and 165a of the baffle walls 163 and 165 are matched to each other, wherein the breather chamber 145 is sectioned and formed.

When transmitting a driving force, pressure in the distribution casing 9 passes from the communication port 159 through the breather chamber 145, and is released into the recessed portion 82 through the opening port 147. In the recessed portion 82, pressure is released to the outside through the notch 86.

Lubricant oil lifted up by rotations of the ring gear 35 and the pinion gear 39 is brought into collision with the third partition wall 153, etc., of the breather chamber 145 and is dropped downward in the distribution casing 9.

Where lubricant oil enters from the communication port 159 of the breather chamber 145, the lubricant oil is obstructed by the baffle walls 163 and 165 and can be prevented from moving to the opening hole 161 side. In addition, even if lubricant oil enters the breather chamber 145, the lubricant oil is returned to the communication port 159 side by descending inclination of the baffle walls 163 and 165 toward the distal end side thereof, wherein it is possible to securely prevent the lubricant oil from moving to the opening hole 161 side.

Further, by setting the first and the second partition walls 149 and 151 for inclination as well, it may be composed that lubricant oil that has invaded the breather chamber 145 can be returned to the communication port 159 side.

<Effects of First Exemplary Embodiment>

According to the first exemplary embodiment, the transfer 1 is provided with the distribution casing 9 formed by matching the first and the second coupling surfaces 66 and 67 of the casing main body 69 and the casing cover 71, a hollow shaft 33 rotatably supported by the casing main body 69 and the casing cover 71 and equipped with the ring gear 35, the axial center of rotation of the hollow shaft 33 being included in the common plane of the first and the second coupling surfaces 66 and 67, and a rear wheel side output shaft 37 rotatably supported at the casing main body 69 and equipped with a pinion gear 39 meshed with the ring gear 35. In the transfer 1, a breather chamber 145 which is connected to interior of the distribution casing 9 via the communication port 159, is sectioned and formed between the first, the second partition walls 149, 151, which are integrally formed in the interior of the casing main body 69 and the casing cover 71 and the plane of which is along the matching direction of the casing main body 69 and the casing cover 71, the third partition wall 153 crossing the first and the second partition walls 149, 151 and having the depth with respect to the first and the second coupling surfaces 66, 67, and the respective outer walls 155, 157 of the casing main body 69 and the casing cover 71. In addition, in the transfer 1, an opening port 147 to open the breather chamber 145 is provided in the distribution casing 9.

Therefore, the first, the second partition walls 149,151 and the third partition wall 153 can be integrally die-cast with the casing main body 69, so that working, assembly and parts management are facilitated, and production costs thereof can be reduced.

Since no partition plate intervenes between the first and the second coupling plates 66 and 67, hardly any clearance is brought about between the first and the second coupling surfaces 66 and 67, wherein it is possible to prevent lubricant oil from invading the communication port 159.

The third partition wall 153 is faced to the opening 88 penetrating the outer wall 155 of the casing main body 69, the rear wheel side output shaft 37 is assembled through the opening 88, and at the same time, the pinion gear 39 is faced to and disposed at the rear side of the third partition wall 153.

Therefore, third partition wall 153 functions as a shield against splashing of lubricant oil, wherein it is possible to securely prevent the lubricant oil from splashing to the breather chamber 145.

The rear wheel side output shaft 37 is rotatably supported at a cylindrical bearing case 87 attached to the opening 88.

Therefore, any special member to seal the opening 88 is not required.

Baffle walls 163 and 165 that are formed so that the planes thereof are along the matching direction of the casing main body 69 and the casing cover 71 and intervene between the communication port 159 and the opening hole 161 of the opening port 147 are provided at the breather chamber 145.

Therefore, even if the lubricant oil enters through the communication port 159 into the breather chamber 145, it is obstructed by the baffle walls 163 and 165, and is prevented from moving to the opening hole 161 side.

The baffle walls 163 and 165 are inclined downward toward the distal end side.

Therefore, even if the lubricant oil enters the breather chamber 145, the lubricant oil is returned to the communication port 159 side by descending inclination of the baffle walls 163 and 165, and it is possible to securely prevent the lubricant oil from going to the opening hole 161 side.

The recessed portion 82 that forms the closed space when the distribution casing 9 is coupled to the bell housing 1 is provided on the outer circumferential side of the distribution casing 9, and the opening port 147 is connected to the recessed portion 82.

Therefore, since a breather pipe and a long-sized exhaust tube connected to the breather pipe are no longer required, the production costs can be reduced.

Second Exemplary Embodiment

Figure 8:
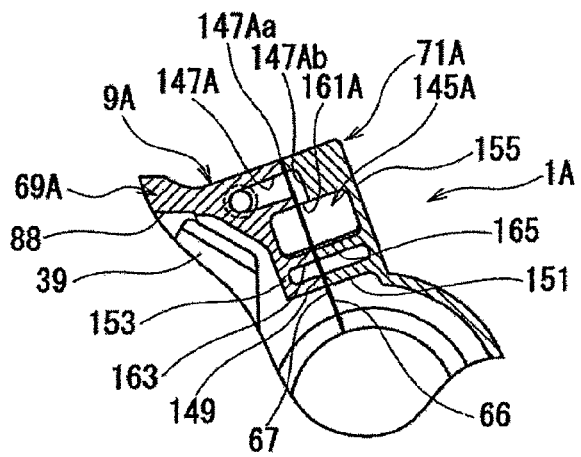
FIG. 8 is a sectional view of a distribution casing according to a second exemplary embodiment.
Figure 9:
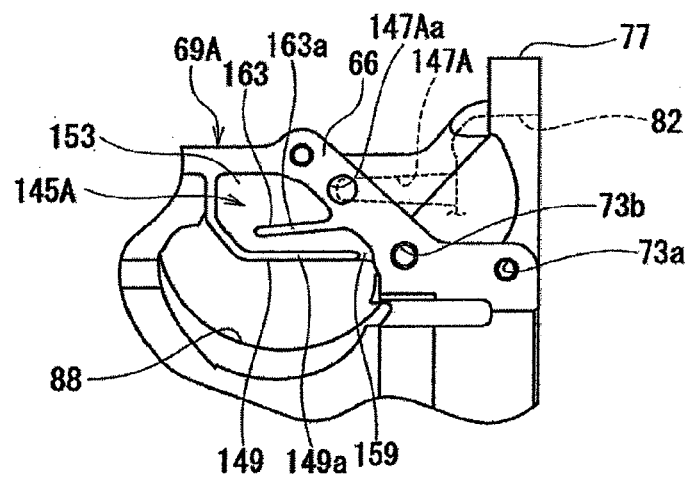
FIG. 9 is a front view of a casing main body of the second exemplary embodiment.
Figure 10:
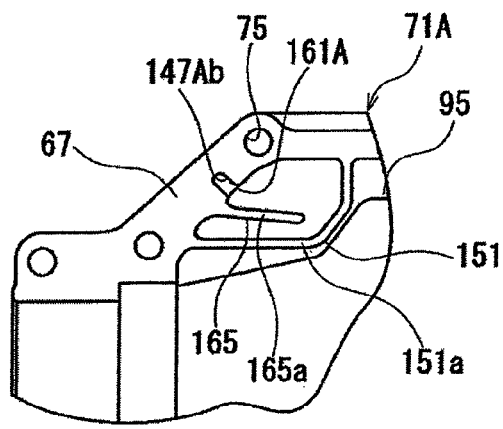
FIG. 10 is a front view of a casing cover of the second exemplary embodiment.

A second exemplary embodiment of the invention is described with reference to FIG. 8 through FIG. 10. FIG. 8 is a sectional view of a distribution casing according to the second exemplary embodiment, corresponding to FIG. 4 for the first exemplary embodiment, FIG. 9 is a front view of the major parts of a casing main body, corresponding to FIG. 5, and FIG. 10 is a front view of the major parts of a casing cover, corresponding to FIG. 7. Since, a basic structure of the second exemplary embodiment is similar to the first exemplary embodiment, components that are identical to or similar to those of the first exemplary embodiment are given the same reference numerals or are shown with "A" attached to the same reference numerals.

As shown in FIG. 8 through FIG. 10, in a transfer 1A according to the second exemplary embodiment, an opening port 147A of a breather chamber 145A communicates with an exterior over the first and the second coupling surfaces 66 and 67 of the casing main body 69 and the casing cover 71.

That is, the opening port 147A of the casing main body 69 has an opening coupling port 147A in the first coupling surface 66 and an opening path 147Ab formed of a recessed portion in the second coupling surface 67 of the casing cover 71, and the end portion of the opening path 147Ab becomes an opening hole 161A opening to the breather chamber 145A.

The breather chamber 145A is made open from the opening hole 161A to the recessed portion 82 by the opening port 147A via the opening path 147Ab and the opening coupling port 147Aa.

Therefore, a channel to open the breather chamber 145A can be lengthened, and it is possible to securely prevent oil from leaking outside the distribution casing 9.

Third Exemplary Embodiment

Figure 11:
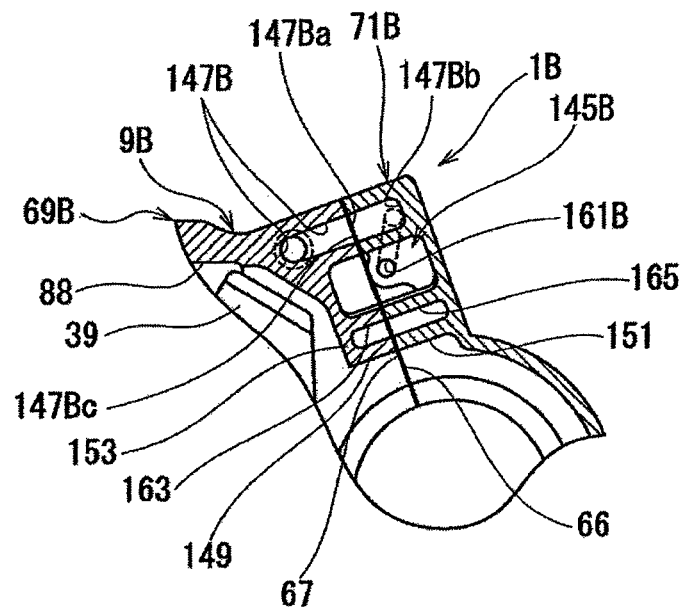
FIG. 11 is a sectional view of a distribution casing of a third exemplary embodiment.
Figure 12:
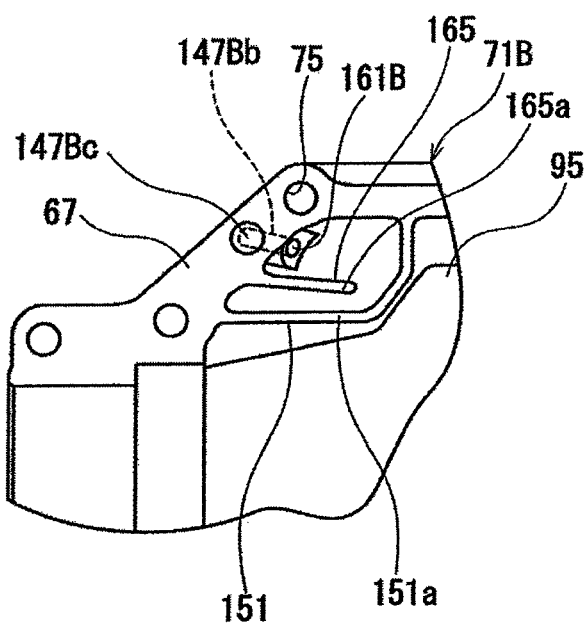
FIG. 12 is a front view of a casing cover of the third exemplary embodiment.

A third exemplary embodiment of the invention is described with reference to FIG. 11 and FIG. 12. FIG. 11 is a sectional view of the major parts of a distribution casing according to the third exemplary embodiment, corresponding to FIG. 8 for the second exemplary embodiment, and FIG. 12 is a front view of the major parts of a casing cover, corresponding to FIG. 10. Also, a basic structure of the third exemplary embodiment is similar to the second exemplary embodiment. Components of the third exemplary embodiment which are identical to or similar to those of the second exemplary embodiment are given the same reference numerals or are shown with "B" instead of "A".

As shown in FIG. 11 and FIG. 12, in a transfer 1B according to the third exemplary embodiment, an opening path 147Bb of an opening port 147B of a breather chamber 145B is formed of a hole, an opening coupling port 147Bc connected to the opening coupling port 147Ba at the second coupling surface 67 is provided. The opening path 147Bb is connected the breather chamber 145B by an opening hole 161B upward of the baffle wall 165.

The breather chamber 145B is opened from the opening hole 161E to the recessed portion 82 by the opening port 147B via the opening path 147Bb and the opening coupling port 147Bc and 147Ba.

Therefore, the channel to open the breather chamber 145B can be lengthened, and it is possible to securely prevent oil from leaking outside the distribution casing 9.

Fourth Exemplary Embodiment

Figure 13:
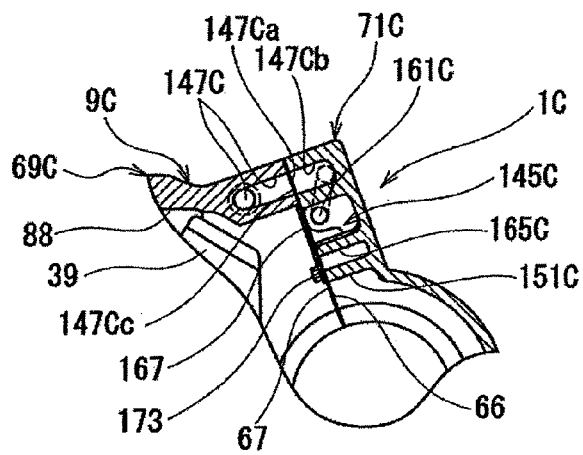
FIG. 13 is a sectional view of major parts of a distribution casing of a fourth exemplary embodiment.
Figure 14:
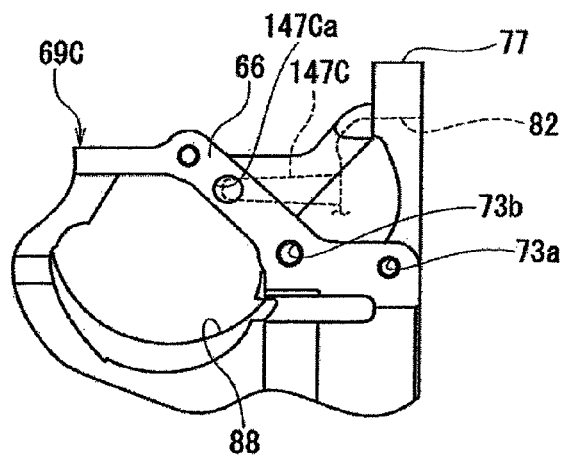
FIG. 14 is a front view of major parts of a casing main body of the fourth exemplary embodiment.
Figure 15:
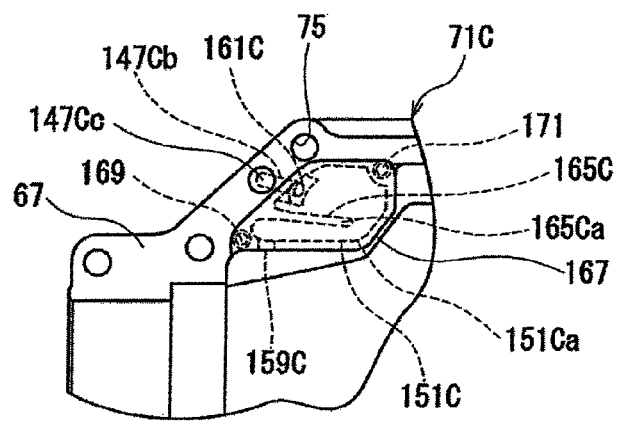
FIG. 15 is a front view of major parts of a casing cover of the fourth exemplary embodiment.
Figure 16:
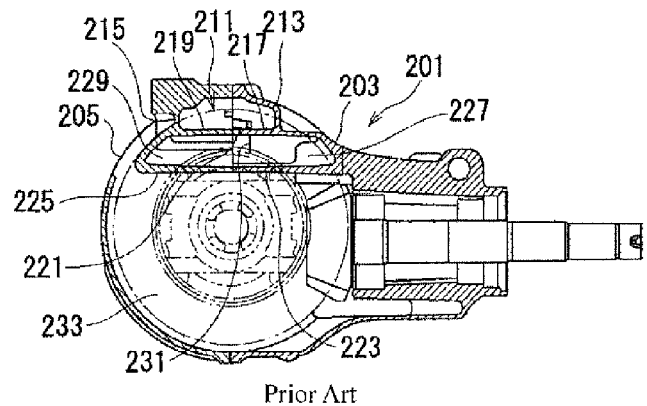
FIG. 16 is a sectional view of a final reduction apparatus (Prior art)
Figure 17:
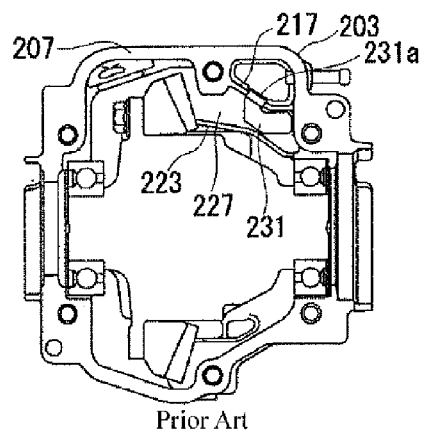
FIG. 17 is a rear side view of a carrier (Prior art)
Figure 18:
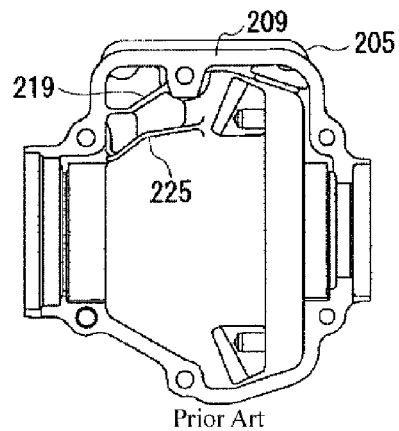
FIG. 18 is a front view of the cover (Prior art).

A fourth exemplary embodiment of the invention is described with reference to FIG. 13 through FIG. 15. FIG. 13 is a sectional view of the major parts of a distribution casing according to the fourth exemplary embodiment, corresponding to FIG. 8 for the second exemplary embodiment, FIG. 14 is a front view of the major parts of the casing main body, corresponding to FIG. 9, and FIG. 15 is a front view of the major parts of the casing cover, corresponding to FIG. 10. Also, a basic structure of the fourth exemplary embodiment is similar to the third exemplary embodiment. Components of the fourth exemplary embodiment which are identical to or similar to those of the third exemplary embodiment are given the same reference numerals or are shown with "C" instead of "B".

As shown in FIG. 13 through FIG. 15, a transfer IC according to the fourth exemplary embodiment has a breather chamber 145C sectioned and formed by the partition wall 151C of the casing cover 71C, a baffle wall 165C and a shield plate 167 attached to the second coupling surface 67. A communication port 159C is between the shield plate 167 and a notch formed in the partition wall 151C. The partition wall 151C has an edge side 1510a. The baffle wall 165C has an edge surface 165Ca.

Threaded holes 169 and 171 are provided at a base part at the second coupling surface 67 side of the partition wall 151C, and the shield plate 167 is fixed by screws 173 tightened in the screw holes 169 and 171.

No partition wall is provided at the casing main body 69C side, only an opening port 147C of the same structure as that of the third exemplary embodiment is formed on the casing main body 69C.

The opening port 147C includes an opening coupling port 147Ca formed on the first coupling surface 66 of the casing main body 69, an opening path 147Cb formed on the casing cover 71C, and an opening coupling port 147Cc formed on the second coupling surface 67 of the casing cover 71C.

Therefore, since no partition plate intervenes between the first and the second coupling surfaces 66 and 67, hardly any clearance is brought about between the first and the second coupling surfaces 66 and 67, wherein lubricant oil is prevented from invading the communication port 1590.

<Others>

In the respective exemplary embodiments, the opening port may be provided at the casing cover side.

In the first to third exemplary embodiments, the communication port 159 may be composed of a recessed portion formed in the second partition wall 151.

In the fourth exemplary embodiment, the breather chamber 145O that is composed of the partition wall 151C, the baffle wall 165O and the shield plate 167 may be provided at the casing main body 69C side.

The driving force transmitting apparatus of the invention is applicable to the final reduction apparatus.

The bevel gear described in the exemplary embodiments is an example of converting driving force transmission to two rotation axes to a crossing direction. The bevel gear also called a bevel wheel of the same meaning includes a conversion gear such as a hypoid gear.

While description has been made in connection with specific exemplary embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

The invention claimed is:

1. A driving force transmitting apparatus comprising:
   a first division casing member having a first coupling surface;
   a second division casing member having a second coupling surface, wherein a casing is formed by matching the first and second casing members at the first and second coupling surfaces;
   a first rotational shaft rotatably supported by the first and the second division casing members, wherein a center of rotation of the first rotational shaft is located in a common plane of the first and second coupling surfaces;
   a first gear provided on the first rotational shaft;
   a second rotational shaft rotatably supported with respect to the first division casing member;
   a second gear provided on the second rotational shaft and being in mesh with the first gear;
   a partition wall integrally formed on the second division casing member and extending in a direction intersecting with said common plane;
   a shield plate crossing the partition wall;
   a breather chamber connected with an interior of the casing and defined by the partition wall, the shield plate, and the an outer wall of the second division casing member; and
   a passage that connects the breather chamber and an exterior of the casing,
   wherein the first rotational shaft has a longitudinal axis, and is rotatable about the longitudinal axis.

2. The driving force transmitting apparatus according to claim 1, further comprising an opening formed on the first division casing member,
   wherein the second rotational shaft passes through the opening.

3. The driving force transmitting apparatus according to claim 2, further comprising: a cylindrical bearing case attached to the opening, wherein the second rotational shaft is rotatably supported in the cylindrical bearing case.

4. The driving force transmitting apparatus according to claim 2, wherein the shield plate is opposed to an opening surface of the opening.

5. The driving force transmitting apparatus according to claim 2, wherein the second gear is disposed to be opposed to the shield plate.

6. The driving force transmitting apparatus according to claim 1, wherein the shield plate is disposed on the second coupling surface.

7. The driving force transmitting apparatus according to claim 1, wherein the passage passes through said common plane.

8. The driving force transmitting apparatus according to claim 1, further comprising: a recessed portion provided on an outer wall surface of the casing, wherein a closed space is formed by the recessed portion when the casing is fixed to another apparatus,
   wherein the passage is connected to the recessed portion.

9. A driving force transmitting apparatus comprising:
   a first division casing member having a first coupling surface;
   a second division casing member having a second coupling surface, wherein a casing is formed by matching the first and second casing members at the first and second coupling surfaces;
   a first rotational shaft rotatably supported by the first and the second division casing members, wherein a center of rotation of the first rotational shaft is located in a common plane of the first and second coupling surfaces;
a first gear provided on the first rotational shaft;
an opening formed on the first division casing member;
a second rotational shaft passing through the opening;
a second gear provided on the second rotational shaft and being in mesh with the first gear;
a breather chamber provided on the second casing member; and
a passage passing through said common plane and connecting the breather chamber and an exterior of the casing,
wherein the first rotational shaft has a longitudinal axis, and is rotatable about the longitudinal axis.

10. The driving force transmitting apparatus according to claim 9, further comprising:
a partition wall integrally formed on the second division casing member and extending in a direction intersecting with said common plane; and
a shield plate crossing the partition wall,
wherein the breather chamber is defined by the partition wall, the shield plate, and the an outer wall of the second division casing member.

11. The driving force transmitting apparatus according to claim 10, wherein the shield plate is opposed to an opening surface of the opening.

12. The driving force transmitting apparatus according to claim 10, wherein the second gear is disposed to be opposed to the shield plate.

13. The driving force transmitting apparatus according to claim 10, wherein the shield plate is disposed on the second coupling surface.

14. The driving force transmitting apparatus according to claim 9, further comprising: a cylindrical bearing case attached to the opening, wherein the second rotational shaft is rotatably supported in the cylindrical bearing case.

15. The driving force transmitting apparatus according to claim 9, further comprising: a recessed portion provided on an outer wall surface of the casing, wherein a closed space is formed by the recessed portion when the casing is fixed to another apparatus,
wherein the passage is connected to the recessed portion.

16. A driving force transmitting apparatus comprising:
a first division casing member having a first coupling surface;
a second division casing member having a second coupling surface, wherein a casing is formed by matching the first and second casing members at the first and second coupling surfaces;
a first rotational shaft rotatably supported by the first and the second division casing members, wherein a center of rotation of the first rotational shaft extends in a first direction located in a common plane of the first and second coupling surfaces;
a first gear provided on the first rotational shaft;
an opening formed on the first division casing member;
a second rotational shaft passing through the opening;
a second gear provided on the second rotational shaft and being in mesh with the first gear; and
a breather chamber,
wherein an end of the breather chamber in a first side of a second direction which is perpendicular to said first direction and is parallel to said common plane is positioned in said first side of the second direction with respect to an end of the second gear in a second side which is opposite to said first side of said second direction,
wherein the first rotational shaft has a longitudinal axis, and is rotatable about the longitudinal axis.

17. The driving force transmitting apparatus according to claim 16, further comprising: a passage passing through said common plane and connecting the breather chamber and an exterior of the chasing.

18. The driving force transmitting apparatus according to claim 16, further comprising:
a partition wall integrally formed on the second division casing member and extending in a direction intersecting with said common plane; and
a shield plate crossing the partition wall,
wherein the breather chamber is defined by the partition wall, the shield plate, and the an outer wall of the second division casing member.

19. The driving force transmitting apparatus according to claim 18, wherein the shield plate is opposed to an opening surface of the opening.

20. The driving force transmitting apparatus according to claim 18, wherein the second gear is disposed to be opposed to the shield plate.

21. The driving force transmitting apparatus according to claim 18, where the shield plate is disposed on the second coupling surface.

22. The driving force transmitting apparatus according to claim 16, further comprising: a cylindrical bearing case attached to the opening, wherein the second rotational shaft is rotatably supported in the cylindrical bearing case.

23. The driving force transmitting apparatus according to claim 16, further comprising: a recessed portion provided on an outer wall surface of the casing, wherein a closed space is formed by the recessed portion when the casing is fixed to another apparatus,
wherein the passage is connected to the recessed portion.

* * * * *